United States Patent Office 3,100,220
Patented Aug. 6, 1963

3,100,220
IMPROVEMENT IN PROCESS FOR MAKING HALO-ALIPHATIC PHOSPHATE ESTERS
Albert L. Smith, Middleport, Ohio, assignor to Celanese Corporation of America, New York, N.Y., a corporation of Delaware
No Drawing. Filed Sept. 6, 1961, Ser. No. 136,174
8 Claims. (Cl. 260—461)

The instant invention relates to a method of producing halogen-substituted organic orthophosphoric acid esters.

More specifically, the instant invention in its preferred aspects relates to a novel procedure for carrying out the old reaction of an oxirane compound with a phosphoryl halide to produce haloaliphatic phosphates. A particularly suitable class of oxirane compounds has the formula

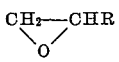

where R is selected from the group consisting of hydrogen, alkyl, and haloalkyl radicals. As is known in the art, the phosphoryl compound is preferably phosphorus oxychloride; however, other phosphoryl halides such as dibutyl chlorophosphate and phenyl dichlorophosphate have also been used, to produce mixed esters.

One object of the instant invention is to provide an improved method for the production of chlorinated alkyl phosphates.

Another object of the instant invention is to provide an improved catalyst for promoting the known reaction of an oxirane compound and a phosphoryl halide.

Further objects and the advantages of the instant invention will be apparent in the description which follows.

One aspect of the instant invention involves reacting the oxirane compound with the phosphoryl halide in the presence of a mixed catalyst comprising titanium tetrachloride and phosphorus trichloride.

Comparative tests have shown that the mixed catalyst is effective to a degree far exceeding what is attained with either catalyst alone. Synergistic catalytic action seems to be present. For a given level of product yield there is a shorter reaction cycle time for the combined catalyst than can be obtained from the same total quantity of either catalyst alone. Moreover, since the product ester is higher in quality than the product obtained with either catalyst above, side reactions have been minimized by employment of this mixed catalyst. An actual increase in yield from a given raw-material charge is possible because the side reaction yield losses have been minimized. Yields exceeding 96% for tris chloropropyl phosphate (based on POCl$_3$) have been attained.

The reaction temperatures will generally be within the range of about 40 to 100° C. with best results being obtained at about 55 to 65° C., e.g. about 60° C. However, even when the reaction temperature rises to relatively high temperatures, e.g. 120–130° C., the catalyst combination of this invention retains its effectiveness to produce light colored products of low acid number; in contrast when titanium tetrachloride is used alone, in the reaction of phosphorus oxychloride and ethylene oxide, the use of such high temperatures results in a dark reaction product of high acidity. As is well known in the art, it is most convenient to carry out the reaction at atmospheric pressure or at a slightly elevated pressure (usually less than 1 atmosphere gage); the slight superatmospheric pressure helps to keep volatile oxirane in the liquid state until it has reacted. It is best to use a reaction mixture which is substantially free of water, preferably containing less than 0.03% water. A good way of combining the reactants is to add the oxirane compound gradually to the POCl$_3$ containing the catalyst, the oxirane being added, preferably, at a rate slow enough to prevent an accumulation of unreacted oxirane in the reaction mixture.

In place of the titanium chloride, one may use other titanium halides, e.g. titanium tetrabromide, or the corresponding zirconium halides.

For the production of triesters, it is preferable to use about 3 equivalents of oxirane compound per mole of POCl$_3$, the use of a slight excess over 3 equivalents being most preferred. Mixtures of oxirane compounds, e.g. mixtures of propylene oxide and ethylene oxide, may be used, to produce the corresponding mixed triesters.

The amounts of the catalyst components are suitably within the range of about 0.1 to 2% of TiCl$_4$ and about 0.1 to 2% of PCl$_3$. Preferably the mixed catalyst is present in the proportion of at least ½%, e.g. ½ to 1% and the individual components are present in about equal proportions by weight, preferably about 0.3 to ½% of TiCl$_4$ and 0.3 to ½% PCl$_3$. All the above proportions are calculated on the basis of the total weight of POCl$_3$ charged to the reaction.

Example I

To POCl$_3$ there was added 0.5% of its weight of TiCl$_4$ followed by 0.5% (based on the weight of POCl$_3$) of PCl$_3$, and the mixture was heated to 60° C. A slight (4.4%) molar excess of propylene oxide (3.13 moles of propylene oxide per mole of POCl$_3$) was slowly added beneath the liquid surface of the heated, stirred mixture, in a stirred, water-jacketed reactor vessel. A reaction temperature of 60°±5° C. was maintained. After all the propylene oxide had been added the reaction mixture was aged an hour at a temperature of 55°–60° C. The acid number of the tris(beta-chloropropyl)phosphate reactor product was 0.8 mg. KOH/gm. before washing. By washing with 1.5% caustic solution, then water, followed by dehydration and filtering the acid number was reduced to 0.01 mg. KOH/gm. The product had good color. The specific gravity was 1.294.

Example II

POCl$_3$ admixed with 0.45% of its weight of TiCl$_4$ and 0.45% of its weight of PCl$_3$ was heated to 60° C. in a stirred jacketed vessel, and epichlorohydrin (4.1 weight percent excess; 3.12 moles per mole of POCl$_3$) was dripped onto the heated stirred mixture. The mixture was maintained at 60±5° C. during addition of the epichlorohydrin and then was aged at 60–70° C. After 4 hours' aging, the acid number of the tris(1,3-dichloropropyl)phosphate was 12.3 mg. KOH/gm.; after 17 hours aging—1.5 mg. KOH/gm. The yield was 97.0% based on POCl$_3$ with good color and a specific gravity of 1.513 at 20/20° C.

Example III

POCl$_3$ containing 0.5 weight percent TiCl$_4$, 0.5 weight percent PCl (both percentages based on weight of POCl$_3$) and 20% (based on weight of POCl$_3$) of trichloroethyl phosphate was reacted with ethylene oxide (3.16 moles per mole POCl$_3$) in place of the propylene oxide, using the reaction conditions of Example I. The reactor product had an acidity of 1.6 mg. KOH/gm.; sp. gr. 1.422. Yield was 94%, based on POCl$_3$, of tris(beta-chloroethyl)phosphate.

It is to be understood that the foregoing detailed description is given merely by way of illustration and that many variations may be made therein without departing from the spirit of my invention.

Having described my invention, what I desire to secure by Letters Patent is:

1. In the process of producing a haloaliphatic phosphate by the reaction of an oxirane compound and a phosphoryl halide, the improvement of which comprises carrying out the reaction in the presence of catalytic amounts of titanium tetrachloride and PCl₃.

2. In the process of producing a chlorinated aliphatic phosphate by the reaction of an oxirane compound and POCl₃, the improvement of which comprises carrying out the reaction in the presence of catalytic amounts of titanium tetrachloride and PCl₃.

3. Process as set forth in claim 2 in which there are present about 0.1 to 2% of titanium tetrachloride and about 0.1 to 2% of PCl₃, the percentages being based on the weight of POCl₃.

4. The process of claim 2 wherein said reaction is effected at a temperature in the range of about 40 to 130° C.

5. A method for the production of tris chloroethyl phosphate which comprises reacting POCl₃ with ethylene oxide at a temperature of about 55 to 65° C. in the presence of a TiCl₄, PCl₃ mixed catalyst amounting to about ½ to 1% by weight of the POCl₃, the above-named components of said catalyst being in a weight ratio of about 1:1.

6. A method for the production of tris chloropropyl phosphate which comprises reacting POCl₃ with propylene oxide at a temperature of about 55 to 65° C. in the presence of a TiCl₄, PCl₃ mixed catalyst amounting to about ½ to 1% by weight of POCl₃, the above-named components of said catalyst being in a weight ratio of about 1:1.

7. A method for the production of tris di-chloropropyl phosphate which comprises reacting POCl₃ with epichlorohydrin at a temperature of about 55 to 65° C. in the presence of a TiCl₄, PCl₃ mixed catalyst amounting to about ½ to 1% by weight of the POCl₃, the above-named components of said catalyst being in a weight ratio of about 1:1.

8. In the process of producing a haloaliphatic phosphate by the reaction of an oxirane compound and a phosphoryl halide, the improvement of which comprises carrying out the reaction in the presence of catalytic amounts of PCl₃ and a halide of a metal of the group consisting of zirconium and titanium.

References Cited in the file of this patent
UNITED STATES PATENTS

| | | |
|---|---|---|
| 2,610,978 | Lanham | Sept. 16, 1952 |
| 2,716,657 | Bretschneider | Aug. 30, 1955 |